March 2, 1965  M. W. GILMORE ETAL  3,171,269
EXTENSIBLE DRIVE SHAFT
Filed April 9, 1962
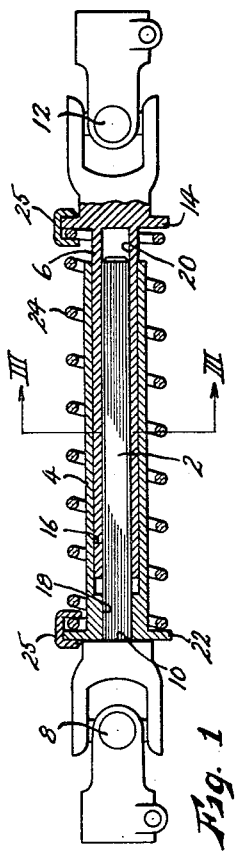
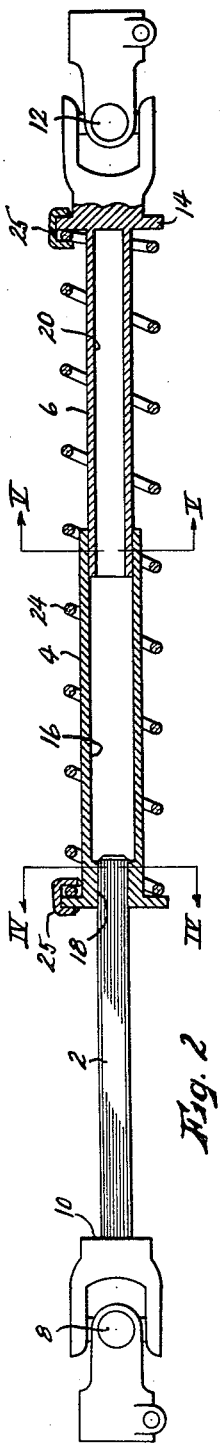
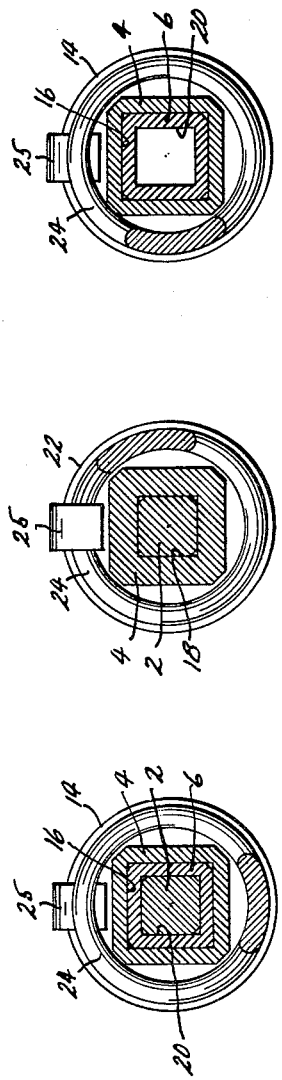
Merwin W. Gilmore
Jerald Bishop
Robert B. Mc Vay
  INVENTORS.
BY John A. Hamilton
   Attorney.

3,171,269
EXTENSIBLE DRIVE SHAFT
Merwin W. Gilmore, Jerald Bishop, and Robert B. McVay, Clay Center, Kans., assignors to Gilmore-Tatge Manufacturing Co., Inc., Clay Center, Kans., a corporation of Kansas
Filed Apr. 9, 1962, Ser. No. 186,156
2 Claims. (Cl. 64—23)

This invention relates to new and useful improvements in drive shafts, and has particular reference to extensible drive shafts of the type commonly used, for example, to transmit operating power from the power take-off shaft of a farm tractor to various farm implements attached to and towed by the tractor, said implements being movable relative to the tractor. Such drive shafts must be readily extensible and retractable in length, and also must usually be provided with a universal joint at each end.

A common problem in drive shafts of this type has been, in certain applications, that they do not provide sufficient extensibility. In an ordinary two-section telescoping drive shaft, the ratio of maximum to minimum length is necessarily less than two to one. The addition of a third telescoping section can provide an extension ratio of about 2½ to 1, which would greatly increase the utility of the shaft in many applications. The three-section shaft has been attempted by various manufacturers, but has been generally unsatisfactory, in view of certain other problems, the elimination of which is the principal object of the present invention.

The principal problem in connection with three-section drive shafts has been to permit the shaft to be fully extended without having two of the sections remain telescoped while the third section pulls entirely free. The method heretofore used to prevent this occurrence has usually constituted a pair of cooperating stops carried respectively by each successive pair of shaft sections. Said stops, being necessarily internal, were relatively small and delicate, and were usually spring-loaded to snap into place as the shaft sections were assembled. The stops were so positioned as to prevent complete separation of each successive pair of shaft sections. However, such stops have proved unsatisfactory, principally because of the great resistance to telescoping slippage of the shaft sections when under torque. Even when the shaft sections are well finished and well lubricated, this slip resistance may amount to several thousand pounds even when the shaft is transmitting only a relatively small horsepower. When the drive shaft is equipped with universal joints at its ends, the force couples introduced by angularity of the joints still further increases the slip resistance. As a result, when the stops associated with two of the shaft sections moved into engagement, the slip resistance involved in extending the third section subjected the stops of the first two sections to a tremendous strain, and the stops would be broken or damaged, or the shaft sections themselves damaged or deformed. It now appears that the provision of internal stops of the type described which are sufficiently strong and durable to withstand this severe service is completely impractical, if not impossible.

Therefore, it may be stated as an important object of the present invention the provision of a three-section drive shaft of the character described which completely dispenses with any stops at all in the usual sense of the word. Generally, this object is accomplished by means of a single very heavy spring biasing a successive pair of shaft sections to an extended position, with sufficient force at all positions to cause extension of these sections even while the shaft is transmitting maximum torque, said spring nevertheless having a fully extended or relaxed position within the maximum degree of extension of the two associated sections, whereby these two sections cannot be separated. Thus the third section cannot be extended from the two spring-biased sections until the latter sections are fully extended relative to each other, but the slip resistance of the third section cannot separate the spring-biased sections.

Other objects are simplicity and economy of construction, efficiency and dependability of operation, and adaptability for use in a wide variety of applications.

With these objects in view, as well as other objects which will appear in the course of the specification, reference will be had to the drawing, wherein:

FIG. 1 is a side elevational view of a drive shaft embodying the present invention, shown retracted to its minimum length, with parts broken away and shown in section, FIG. 2 is a view similar to FIG. 1, but showing the shaft extended to its maximum length, FIG. 3 is an enlarged sectional view taken on line III—III of FIG. 1, and FIGS. 4 and 5 are enlarged sectional views taken respectively on lines IV—IV and V—V of FIG. 2.

Like reference numerals apply to similar parts throughout the several views, and the numerals 2, 4 and 6 apply respectively to the three relatively slidable sections of the drive shaft forming the subject matter of this invention. Section 2 is provided at its outer end with a universal joint 8 by means of which it may be operably connected, for example, to the power take-off shaft of a farm tractor. Said universal joint provides a shoulder 10 disposed at right angles to the shaft axis, and facing along the shaft. Section 6 is also provided at its outer end with a universal joint 12 by means of which it may be operably connected, for example, to the power imput shaft of an implement connected to and towed by the farm tractor. Universal joint 12 is provided at its inner end with a flange 14 disposed at right angles to the shaft axis and facing along the shaft.

Shaft section 2 as shown is square in cross-sectional shape. Section 4 is tubular or hollow, the bore 16 thereof being square in cross-section. The end portion of bore 16 closest to universal point 8 is reduced in size, as at 18, to receive shaft section 2 slidably but non-rotatably therein. Shaft 6 is also tubular, being of square cross-sectional shape both externally and internally. Externally, section 6 fits slidably but non-rotatably in bore 16 of section 4. The bore 20 of section 6 receives section 2 slidably therein when the shaft is retracted as in FIG. 1. It is not essential that bore 20 be square to prevent rotation of section 2 therein, since section 2 can deliver full normal torque by its engagement in the reduced portion 18 of bore 16 of section 4. Nevertheless, making bore 20 square and of a size to receive shaft section 2 non-rotatably therein increases the load capacity of the shaft whenever the shaft is retracted sufficiently to engage section 2 in section 6. In fact, when this engagement occurs the shaft is essentially a two-section shaft, with section 4 being substantially inoperative.

Section 4 is provided at the end thereof closest to universal joint 8 with an external peripheral flange 22. A helical compression spring 24 surrounds the shaft, bearing at one end against flange 22, and bearing at its opposite end against flange 14 of universal joint 12. The ends of the spring are securely affixed respectively to flanges 13 and 22 by any suitable means, such as by clips 25. This spring urges shaft sections 4 and 6 to a relatively extended position as shown in FIG. 2. It is a very strong spring, exerting sufficient force to extend sections 4 and 6 even when the shaft is transmitting maximum torque and the slip resistance of these sections is greatest.

Nevertheless, said spring reaches its fully extended position, and is relaxed, while shaft sections 4 and 6 are still sufficiently engaged to transmit full load. This fully extended position of the spring is illustrated in FIG. 2.

As the shaft is retracted, section 2 thereof first slides into section 4, telescoping of section 4 over section 6 being prevented by the spring. When section 2 is fully encased in section 4, shoulder 10 engages flange 22 of section 4, and forces section 4 to slide over section 6 against the pressure of the spring, and section 2 enters the internal bore 20 of section 6. The direct operative engagement of the two end sections 2 and 6, at shorter shaft lengths, whereby the shaft becomes substantially a two-section shaft with section 4 being inoperative, is considered to be a distinctive feature of the invention in view of the generally greater strength and efficiency of two-section shafts as compared to shafts having three or more sections. It is accomplished in the present structure by telescoping both the two end sections internally in the central section, so that said end sections may engage directly with each other.

As the shaft is lengthened, sections, 4 and 6 are first extended relative to each other, the spring holding flange 22 against shoulder 10 so that section 2 cannot be extended from section 4. The spring is sufficiently strong to slide section 4 on section 6 even under full torque load. When sections 4 and 6 are extended substantially to the position shown in FIG. 2, spring 24 is relaxed as previously described, and further lengthening of the shaft will cause section 2 to slide outwardly in section 4. Since spring 24 resists elongation beyond its relaxed length just as strongly as it resists compression, the slip resistance of section 2 in section 4 cannot cause separation of section 4 from section 6. Separation of section 2 from section 4 is of course prevented by the use of a drive shaft having a maximum length at least as great as that required for each particular installation.

While we have shown and described in specific embodiment of our invention, it will be readily apparent that many minor changes of structure and operation could be made without departing the spirit of the invention as defined by the scope of the appended claims.

What we claim as new and desire to protect by Letters Patent is:

1. A drive shaft operable to be extended and retracted while transmitting power, said drive shaft comprising:
   (a) first, second and third sections telescoped successively together for relative sliding movement parallel to the axis of the shaft but secured against relative rotation about said shaft axis, said first and third sections being operable to engage each other directly when the shaft is retracted to a total length less than the combined lengths of said first and third sections, said first and third sections when so engaged being relatively slidable longitudinally of the shaft but relatively non-rotatable about the axis of the shaft, whereby said second or intermediate shaft is rendered substantially inoperative, and
   (b) a spring biasing a successive pair of said sections toward but not beyond an extended position in which they provide a maximum length but are still operatively engaged.

2. A drive shaft as recited in claim 1 wherein said first and third shaft sections are both telescoped internally within said second shaft section, and wherein said third section is tubular to receive said first section slidably but non-rotatably therein whenever said shaft is retracted to a total length less than the combined lengths of said first and third sections.

References Cited in the file of this patent

UNITED STATES PATENTS

| 1,631,236 | Werner | June 7, 1927 |
| 1,933,404 | Allen et al. | Oct. 31, 1933 |
| 2,468,182 | Dempsey | Apr. 26, 1949 |
| 2,619,321 | Haase | Nov. 25, 1952 |
| 2,695,504 | Magee | Nov. 30, 1954 |

FOREIGN PATENTS

| 216,906 | Great Britain | June 10, 1924 |